(12) United States Patent
Siebert

(10) Patent No.: US 11,719,236 B2
(45) Date of Patent: Aug. 8, 2023

(54) FLOW CONTROL VALVE

(71) Applicant: United States Department of Energy, Washington, DC (US)

(72) Inventor: Brett W. Siebert, Niskayuna, NY (US)

(*) Notice: Subject to any disclaimer, the term of this patent is extended or adjusted under 35 U.S.C. 154(b) by 25 days.

(21) Appl. No.: 17/520,804

(22) Filed: Nov. 8, 2021

(65) Prior Publication Data

US 2022/0403838 A1 Dec. 22, 2022

Related U.S. Application Data

(60) Provisional application No. 63/211,808, filed on Jun. 17, 2021.

(51) Int. Cl.
*F15D 1/02* (2006.01)
*F04B 53/10* (2006.01)
*F15D 1/04* (2006.01)
*F16K 51/00* (2006.01)

(52) U.S. Cl.
CPC ............ *F04B 53/1077* (2013.01); *F15D 1/04* (2013.01); *F16K 51/00* (2013.01); *F28F 2210/02* (2013.01)

(58) Field of Classification Search
CPC ........ F04B 53/1077; F15B 1/04; F16K 51/00; F28F 2210/02
USPC .............................. 138/37, 39, 42
See application file for complete search history.

(56) References Cited

U.S. PATENT DOCUMENTS

| | | |
|---|---|---|
| 1,329,559 A | 2/1920 | Tesla |
| 3,424,437 A * | 1/1969 | Shearer ............... B01F 25/4321 138/42 |
| 3,780,767 A * | 12/1973 | Borg ....................... F16K 47/08 137/625.37 |
| 3,871,215 A * | 3/1975 | Pratt, Jr. ................... G01L 3/12 73/862.28 |
| 4,655,397 A * | 4/1987 | Gorney ................. A01G 25/023 239/542 |
| 5,265,636 A * | 11/1993 | Reed ....................... F15C 1/146 137/833 |
| 6,095,196 A * | 8/2000 | McCarty ................. F16K 47/08 138/40 |
| 7,357,619 B1 * | 4/2008 | Del Rio .................. F03D 80/00 138/44 |
| 8,291,976 B2 * | 10/2012 | Schultz .................... E21B 43/12 166/334.4 |
| 10,602,638 B2 * | 3/2020 | North .................. H05K 7/20154 |
| 11,275,136 B2 * | 3/2022 | Voss ......................... F25B 41/20 |
| 2008/0210326 A1* | 9/2008 | Goulet .................... F16K 47/08 137/810 |
| 2018/0051943 A1* | 2/2018 | Gissen .................... F28F 3/048 |

* cited by examiner

*Primary Examiner* — James F Hook
(74) *Attorney, Agent, or Firm* — Robert T. Burns; Jonathan W. Parthum; Brian J. Lally

(57) ABSTRACT

Disclosed is a flow device including an inlet, an outlet, and a plurality of fluid flow paths hydraulically connected in parallel to the inlet and the outlet, wherein the plurality of fluid flow paths forms a first ring of fluid flow paths circumferentially arranged at a first radial distance from a centerline of the fluid flow device a second ring of fluid flow patch circumferentially arranged at a second radial distance from the centerline of the fluid flow device, each of the plurality of fluid flow paths has a first hydraulic resistance in a forward flow direction and a second hydraulic resistance in a reverse flow direction, and the second hydraulic resistance is greater than the first hydraulic resistance.

15 Claims, 9 Drawing Sheets

FLOW CONTROL VALVE

CLAIM TO PRIORITY

This application claims priority to U.S. Provisional Patent Application Ser. No. 63/211,808 filed Jun. 17, 2021, the entirety of which is herein incorporated by reference.

NOTICE OF GOVERNMENT RIGHTS

The United States Government has rights in this application and any resultant patents claiming priority to this application pursuant to contract DE-NR0000031 between the United States Department of Energy and Bechtel Marine Propulsion Corporation Knolls Atomic Power Laboratory.

TECHNOLOGICAL FIELD

This present subject matter relates to flow control valves. More particularly, the present subject matter relates to flow control valves with no moving parts.

BACKGROUND

Valves are placed in fluid systems to control flow. In particular, check valves are placed in fluid systems to permit forward flow while preventing reverse flow. Check valves have desirable flow characteristics but require moving parts subject to part wear and tear. In 1920, Nikola Tesla patented what has come to be known as the Tesla valve. A Tesla valve greatly reduces the amount of reverse flow, without moving parts. This fluidic diode behavior is desirable because it reduces reverse flow without moving parts and without operator action. One drawback of a traditional Tesla valve is that even though it has a relatively high hydraulic resistance to reverse flow, it also has a significant hydraulic resistance to forward flow. This forward hydraulic resistance to flow effectively obstructs forward flow, lessening the rate that fluid can perform desired work. A need therefore exists for a flow control valve with no moving parts that has high hydraulic resistance to flow in the reverse direction, but low hydraulic resistance to flow in the forward direction.

SUMMARY

Certain exemplary embodiments of the present subject matter include a flow device having an inlet, an outlet, and a plurality of fluid flow paths hydraulically connected in parallel to the inlet and the outlet, wherein each of the plurality of fluid flow paths has a first hydraulic resistance in a forward flow direction and a second hydraulic resistance in a reverse flow direction, and the second hydraulic resistance is greater than the first hydraulic resistance.

In other exemplary embodiments of the present subject matter, a flow device includes an inlet, an outlet, and a plurality of fluid flow paths hydraulically connected in parallel to the inlet and the outlet, wherein the plurality of fluid flow paths forms a first ring of fluid flow paths circumferentially arranged at a first radial distance from a centerline of the fluid flow device a second ring of fluid flow patch circumferentially arranged at a second radial distance from the centerline of the fluid flow device, each of the plurality of fluid flow paths has a first hydraulic resistance in a forward flow direction and a second hydraulic resistance in a reverse flow direction, and the second hydraulic resistance is greater than the first hydraulic resistance.

BRIEF DESCRIPTION OF THE DRAWINGS

A description of the present subject matter including various embodiments thereof is presented with reference to the accompanying drawings, the descriptions not intended to be considered limiting in any matter, wherein.

Similar reference numerals and designators in the various figures refer to like elements.

DETAILED DESCRIPTION

Figure 1A:
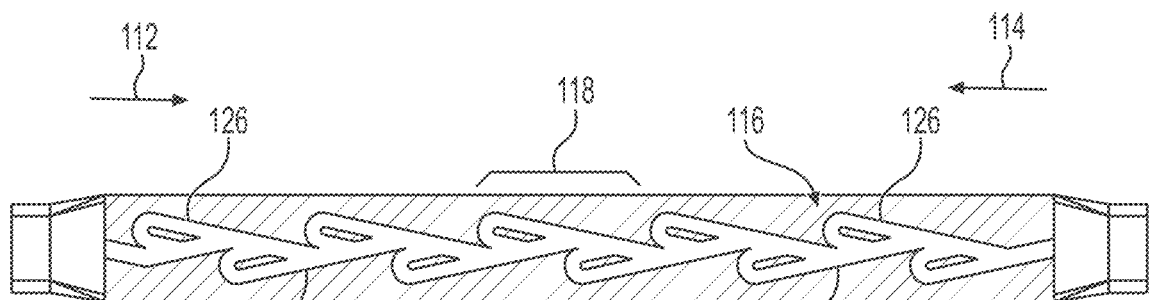
FIGS. 1A-1C illustrate a traditional Tesla valve.
Figure 1B:
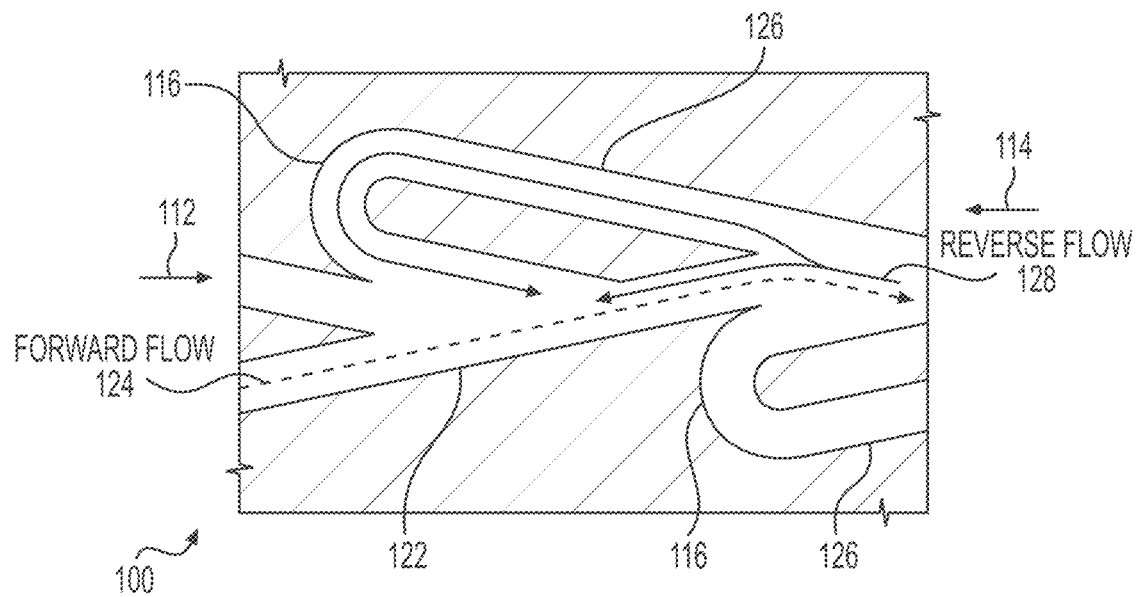
Figure 1C:
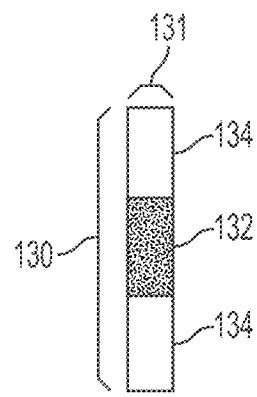

FIGS. 1A-1C illustrate a traditional Tesla valve 100. A Tesla valve is a flow control device with no moving parts that can suppress reverse flow. Tesla valves provide a maintenance-free fluidic diode behavior by arranging a tortuous flow path where reverse flow is turned to act against itself, thereby lowering the net reverse flow. FIG. 1A illustrates a top view cross section of a traditional Tesla valve 100. The configuration has a rectangular cross-section in the direction out of the page, with a forward (primary) flow direction 112 and a reverse (secondary) flow direction 114. As defined herein, "axial' means the forward (primary) flow direction 112. Valve 100 includes one or more tortuous loops 116 to branch reverse flow 114 against itself. From a forward flow perspective, these tortuous loops 116 are a dead flow region (i.e. they are closed to forward flow, forming a closed flow area from a forward flow perspective).

FIG. 1B illustrates an exemplary axial segment 118. The embodiment shown includes multiple tortuous loops 116 arranged in axial segments 118. An axial segment 118 includes a forward flow path 122 for forward flow 124 and a reverse flow path 126 provided by one or more tortuous loops 116. An arbitrary number of axial segments 118 can be included in a traditional Tesla valve 100. The exemplary embodiment of FIG. 1A illustrates five segments 118. The tortuous loops 116 are configured to suppress reverse flow 128 by branching off and redirecting at least a portion of the reverse flow 128 against itself. Forward flow 124, in contrast, generally proceeds unimpeded in the forward flow direction 112. Thus, from a forward flow perspective, the tortuous loops 116 are basically dead flow regions with no impact to forward flow 124—resulting in relatively low hydraulic resistance in the forward flow direction 112. Reverse flow 128 however, is split and branches into one or more of the tortuous loops 116.

Reverse flow exiting a tortuous loop 116 is redirected to flow in the forward flow direction 112, impeding oncoming reverse flow 128. Reverse flow 128 continues to branch into additional tortuous loops 116, thereby compounding the effect of redirecting portions of the remaining reverse flow 128 against itself. The compounding effect of redirecting reverse flow 128 against itself results in a relatively high hydraulic resistance in the reverse flow direction 114.

FIG. 1C illustrates a graphical representation of the total effective flow area 130, divided into an open flow path area 132 and a closed flow path area 134 of the traditional Tesla valve 100. These traditional Tesla valve flow paths have a rectangular cross section 131, with the open flow path area 132, even in the forward flow direction 112, reduced to approximately ⅓ of the total effective flow area 130. In this configuration, each tortuous loop 116 connects with the same forward flow path 122, with tortuous loops 116 on both sides of the forward flow path 122 effectively taking up ⅔ of the available flow path area 130. Thus only ⅓ of the overall valve area is open to forward flow 124. With this relatively high closure area, the parasitic losses of forward flow 124 are relatively high—reducing the utility of incorporating a traditional Tesla valve 100 into a larger system (not shown), even if its benefit (a tendency to dampen reverse flow without moving parts) is also high. These two disadvantages (the rectangular flow path configuration and the effective blockage of ⅔ of the forward flow area) restrict the practical utility of a traditional Tesla valve in circular cross-section pipe networks (not shown). Traditional Tesla valves 100 are therefore mostly considered a fluids engineering novelty rather than a practical option for use in a large-scale industrial piping system.

Figure 2A:
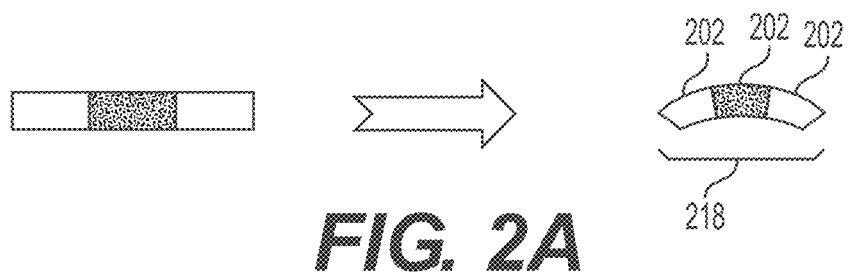
FIGS. 2A-2C illustrates an exemplary embodiment of a cylindrically-modified Tesla valve.
Figure 2B:
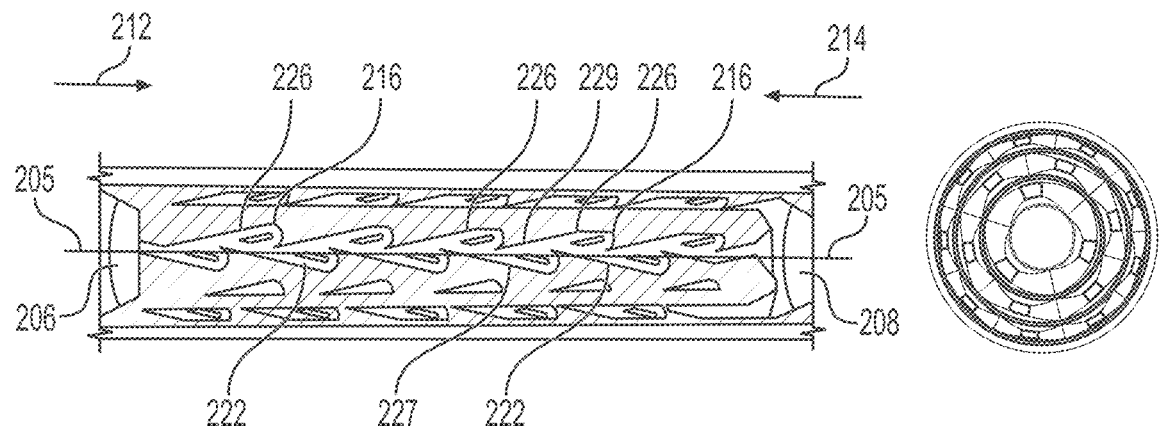
Figure 2C:
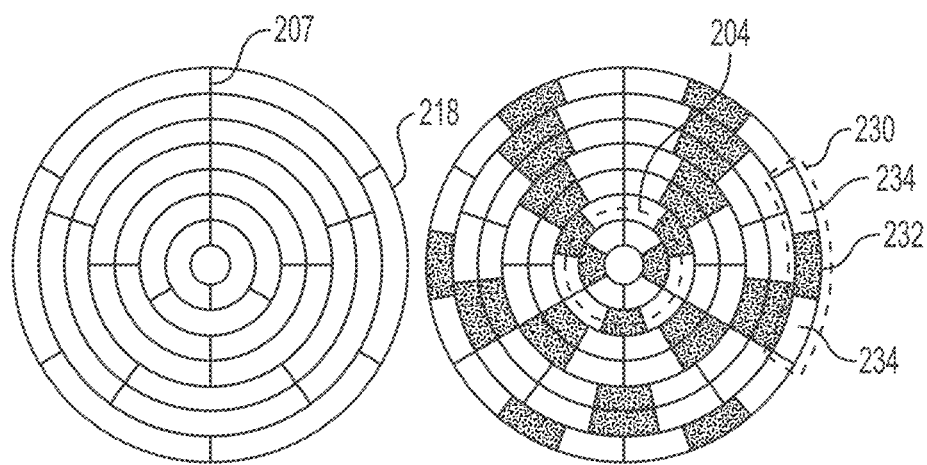

FIGS. 2A-2C illustrate an exemplary embodiment of a cylindrically-modified Tesla valve 200. As shown in FIG. 2A, the traditional Tesla valve geometry cross-section is modified from a rectangular cross section 131 into one or more cross sections having flow path walls bounded by one or more small scale azimuthal arcs 202. This makes it adaptable to large scale, piping systems (not shown), because the arcs can be combined to form a ring, and one or more rings can be built up to reach a desired pipe diameter. Back fitting traditional rectangular Tesla valves into a circular piping system, in contrast, requires extra coupling features having additional parasitic detrimental impacts. Rather than the valve cross-section exhibiting the flat rectangular (infinite radius of curvature) shape of a traditional Tesla valve 100, a cylindrically-modified Tesla valve 200 includes one or more flow paths having finite inner and outer radii of curvatures to facilitate placement in a curved cross section pipe with one or more curved axial segments 218, which include a forward flow path 222 for forward flow 224 in a forward flow direction 212 and a reverse flow path 226 for at least a portion of the reverse flow 228 in a reverse flow direction 214. The forward flow path 222 is relatively straight, while the reverse flow path 228 is configured to pass through one or more tortuous loops 216, where at least of the portion of the reverse flow passing through a tortuous loop 216 is redirected to merge with the forward flow 124, opposing the remaining reverse flow 228.

In the exemplary embodiments of FIGS. 2A-2C, one or more tortuous loops 216 are configured to suppress reverse flow 228 by branching off and redirecting reverse flow 228 against itself. Forward flow 224, in contrast, generally proceeds unimpeded in the forward flow direction 212. Thus, from a forward flow perspective, the tortuous loops 216 are basically dead flow regions with no impact to forward flow 224—resulting in relatively low hydraulic resistance in the forward flow direction 212. Reverse flow 228 however, is split and branches into one or more of the tortuous loops 216. Reverse flow exiting a tortuous loop 216 is redirected to flow in the forward flow direction 212, impeding oncoming reverse flow 228. Reverse flow 228 continues to branch into additional tortuous loops 216, thereby compounding the effect of redirecting portions of the remaining reverse flow 228 against itself. The compounding effect of redirecting reverse flow 228 against itself results in a relatively high hydraulic resistance in the reverse flow direction 214.

FIG. 2B illustrates an exemplary cutaway view of an exemplary cylindrically-modified Tesla valve 200. The left side of FIG. 2B illustrates a cutaway view of a cylindrically-modified Tesla valve 200 viewed from an axial perspective, while the right side of FIG. 2B illustrates a radial perspective. In the exemplary embodiment shown, the curved axial segments 218 enable connecting multiple flow paths together in a parallel flow circular configuration, forming an effectively larger valve and/or facilitating incorporation into large scale pipe geometries (non-capillary, non-micro fluidic flows) (not shown). In the embodiment shown, a plurality of grouped curved axial segments 218 are arranged circumferentially (azimuthally) to form one or more flow path rings 204. The exemplary embodiment shown includes an inlet 206, an outlet 208, and a plurality of forward primary flow paths 222 and reverse flow paths 226 hydraulically connected in parallel to inlet 206 and outlet 208. Each of the curved axial segments 218 includes at least one forward flow path 222 having a first hydraulic resistance in a forward flow direction 212 and at least one reverse flow path 226 having a second hydraulic resistance in a reverse flow direction 214, with the second hydraulic resistance being greater than the first hydraulic resistance.

Figure 9:
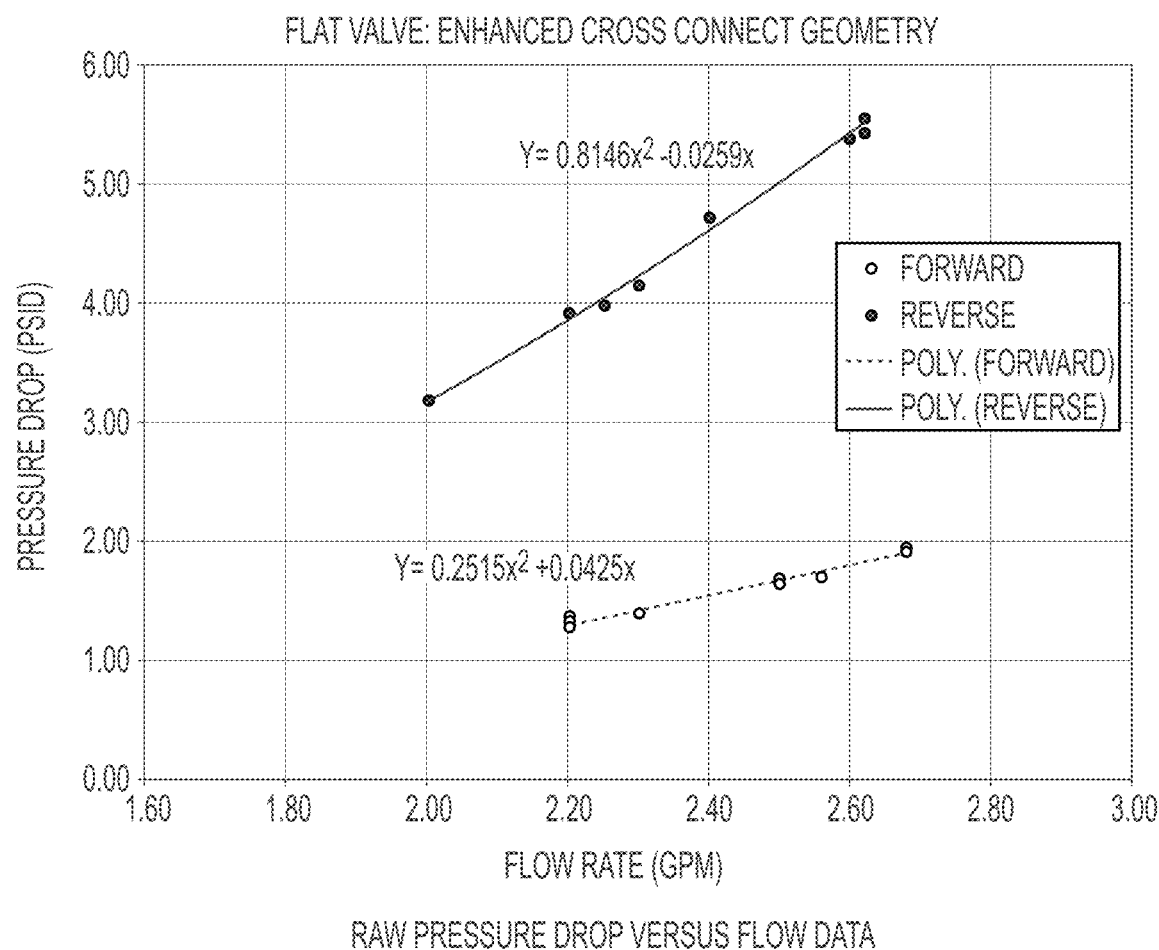
FIGS. 9 and 10 illustrate test data of selected exemplary embodiments of cylindrically-modified Tesla valves.
Figure 10:
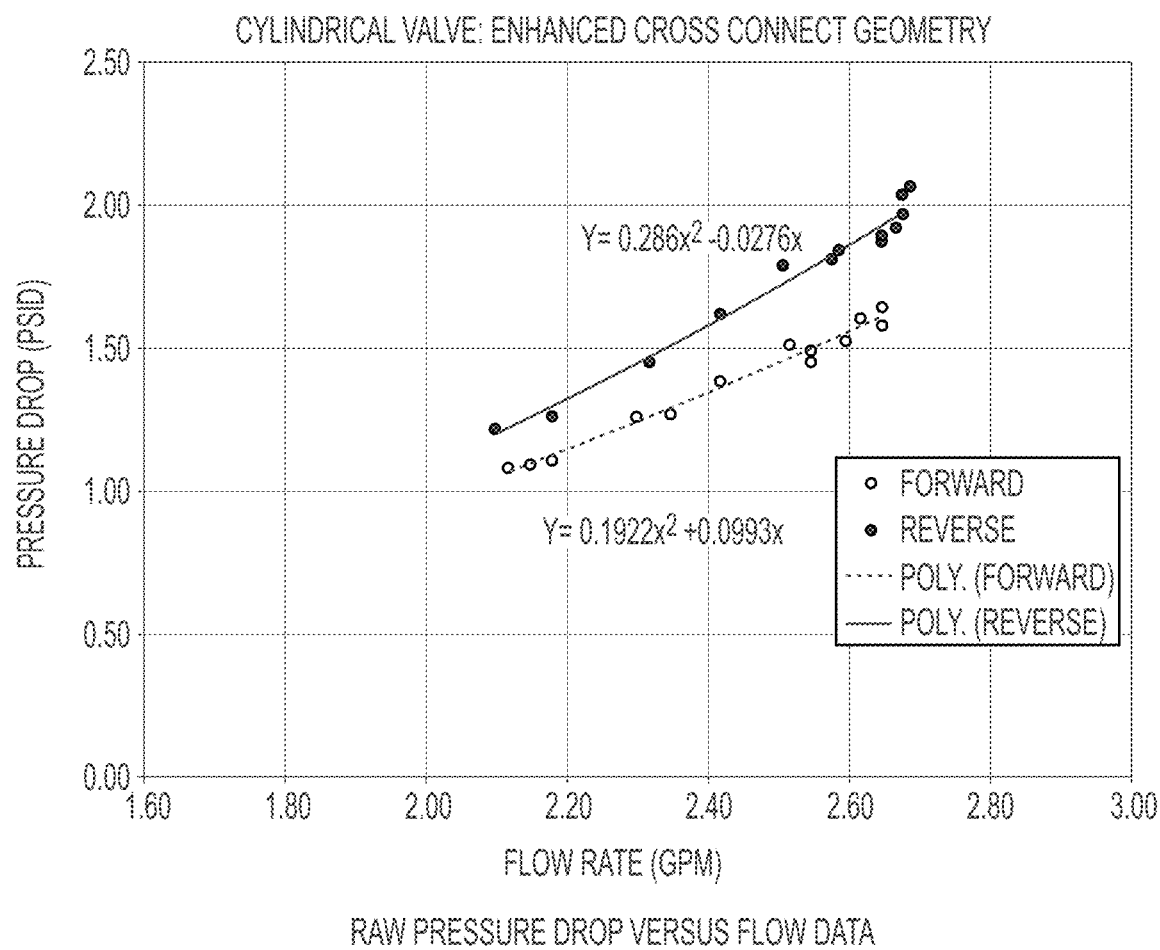

In certain embodiments, each of the plurality of forward flow paths 222 has a first pressure drop in a forward flow direction 212 and the plurality of reverse flow paths 226 have a second pressure drop in a reverse flow direction 214, with the second pressure drop being greater than the first pressure drop. Examples of pressure drops and flow rates in certain exemplary embodiments are illustrated in FIGS. 9 and 10. In the embodiments shown, one or more of the plurality of forward and reverse flow paths 222/226 is coaxially-arranged around a flow device centerline 205, with the forward flow area 225 in each of the plurality of forward flow paths 222 varying as a function of a radial distance 207 from the flow device centerline 205. In certain embodiments the forward flow area 225 changes with a square of the radial distance 207 from the flow device centerline 205. Still other embodiments include at least one tortuous loop 216 in at least one of the reverse flow paths 226, with the at least one tortuous loop 216 on a first side 227 of the at least one forward flow path 222 and configured to direct at least a portion of fluid flowing in the reverse flow direction 214 back against itself. Still other exemplary embodiments include a second tortuous loop 216 connected in series with the first tortuous loop 216 on a second side 229 of the at least one forward flow path 222, with the second tortuous loop 216 configured to direct at least a portion of the remaining reverse flow 228 back against itself.

FIG. 2C illustrates a graphical representation of the total effective flow area 230, divided into an open flow path area 232 and a closed flow path area 234 of the exemplary modified Tesla valve 200. Although the curved axial segments 218 facilitate placement of the modified valve 200 in a curved pipe as part of a large scale (non-micro-fluidic, non-capillary) piping systems (not shown) the open flow path area 232, even in the forward flow direction 212, is still reduced to approximately ⅓ of the total effective flow area 230. Each individual valve has two "runs" of looping structures (forming the tortuous flow path): one on each of opposing first and second sides 227 and 229 of a forward flow path 222, with each tortuous loop 216 still supporting only a single forward flow path 222. In this configuration, each torturous loop 216 still connects with the same forward flow path 222, with torturous loops 216 on both sides 227/229 of the forward flow path 222 effectively taking up ⅔ of the available flow path area 230. Thus only ⅓ of the total area 230 is open to forward flow 224. With this relatively high closure area, the parasitic losses of forward flow 224 are still too high—reducing the utility of incorporating this exemplary modified Tesla valve 200 (even with its enhanced installation advantages) into large-scale (non-micro-fluidic, non-capillary) piping systems (not shown).

Figure 3A:
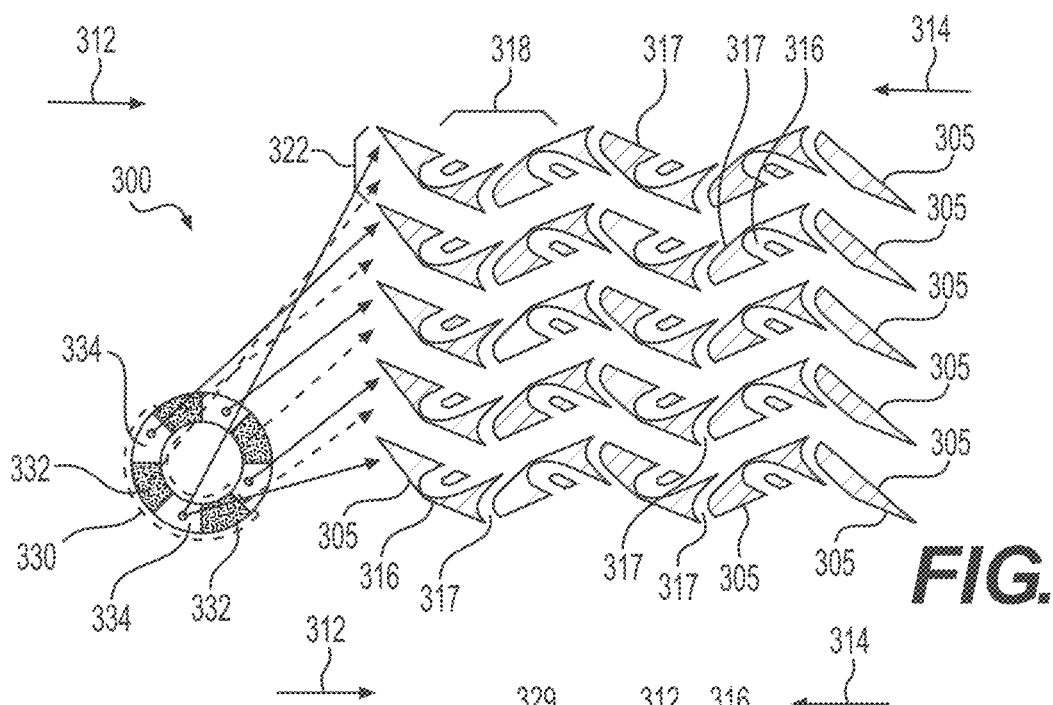
FIGS. 3A-3C illustrate an exemplary embodiment of an enhanced cylindrically-modified flow path ring.
Figure 3B:
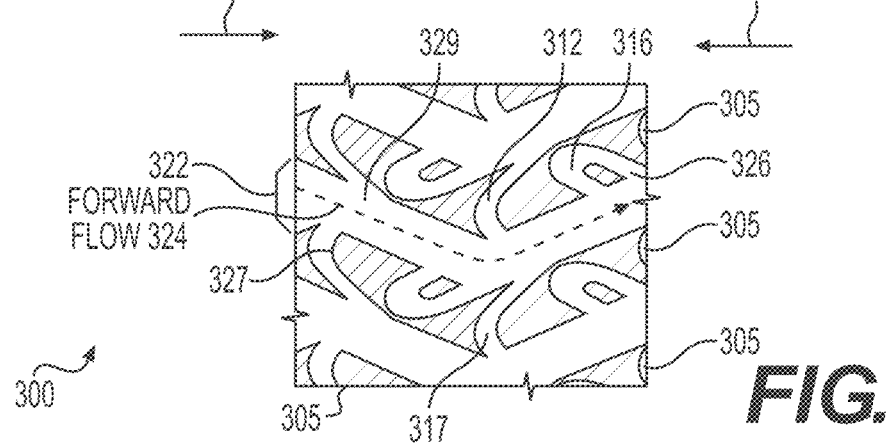
Figure 3C:
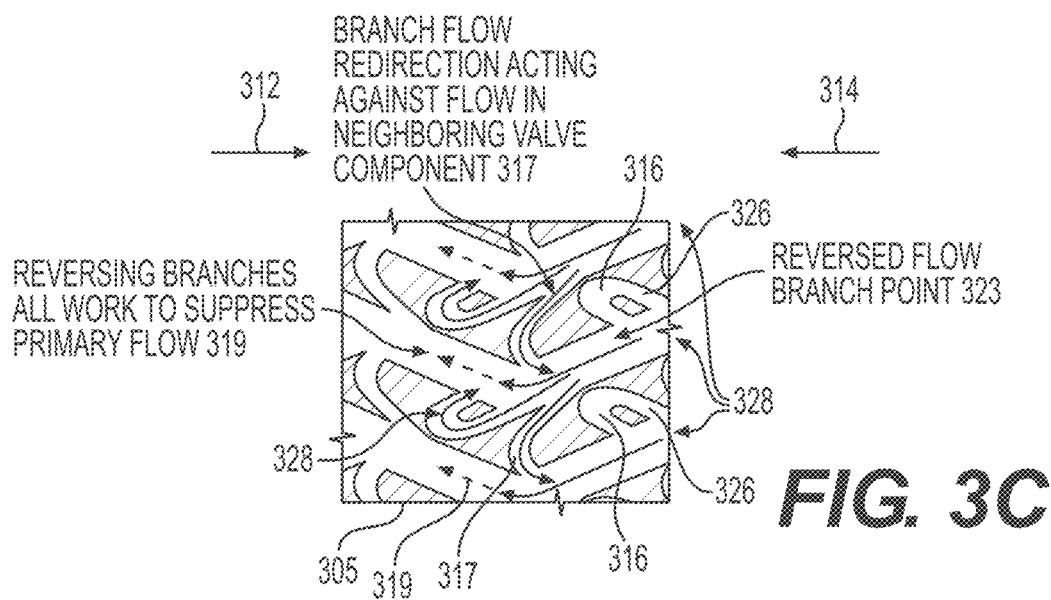

FIGS. 3A-3C illustrate an exemplary embodiment of an enhanced cylindrically-modified flow path ring 300. The exemplary ring includes enhancements which further modify flow path characteristics of the valve to take advantage of an azimuthal ring arrangement so as to open up approximately ½ of their total area 330 to forward flow open flow path area 332. As shown in the exemplary embodiment of FIGS. 3A-3C, at least two tortuous loops 316 support a forward flow path 322—one a forward flow path first side 327 and a second on a forward flow path second side 329. At each subsequent axial segment 318 (which can but need not be curved), a zig-zag pattern is in place and the tortuous loops 316 switch the flow path side with which they interact first a forward flow path first side 327 then forward flow path second side 329 then back to the forward flow path first side 327, and so on). This significantly increases the forward flow open flow path area 332, as illustrated FIG. 3A, with the forward flow open flow path area 332 and the closed forward flow path area 334 less than half of the total area 330. In the exemplary embodiment, the area of the valve closed to forward flow (i.e. the solidity of the valve) is the ratio of the arc of the primary flow path 322 divided by the net arc of an azimuthal valve component (322 and 334). This ratio can be changed by altering the relative arc size of the loop structures 334. Such a change can alter the ability of the tortuous paths to redirect reverse flow and impact the diode-type behavior to achieve other total area amounts open or closed to forward flow.

In certain exemplary embodiments, at least one tortuous loop 316 connects with at least one connecting path 317 to divert reverse flow 328 to a forward flow path 322 on the other side of a segment 318. In certain of these embodiments, connecting path 317 connects to at least one other forward flow path 322. In certain exemplary embodiments, connecting path 317 branches reverse flow from one tortuous loop 316 to another forward flow path 322, with the redirected flow being directed against reverse flow 328 in the other forward flow path 322, thereby impeding remaining reverse flow 328.

In the exemplary embodiments of FIGS. 3A-3C, from a forward flow perspective, the first/inlet axial segment 318 has an intra-path looping structure, and the last/exit axial segment 318 has an inter-path connection. FIG. 3A provides a detailed azimuthal unwinding of the modified geometry for an enhanced cylindrically-modified flow path ring 300, showing an extended view of an exemplary ring/cross section combination. In the exemplary embodiment shown, a set of flow path walls 305 is repeated at the top and bottom of the figure, indicating a full traversal of the circle; they are the same entity. The exemplary embodiment illustrated in FIG. 3A contains four forward flow paths 322. The number of forward flow paths 322 shown is exemplary only, as any number can be included without departing from the scope of the present subject matter. In certain exemplary embodiments, the first/last axial segments 318 are angled to the axial direction to gradually funnel flow into the flow paths.

With this modification, redirected reverse flow 328 not only acts to impede the remaining reverse flow in its associated forward flow path 322, but it also impedes reverse flow 328 in another forward flow path 322.

FIG. 3B illustrates how in this exemplary configuration forward flow 324 has little or no tendency to branch. As shown in FIG. 3B, the configuration has a significantly different effect on reverse flow 328 that effectively increases the open flow path area 332. As reverse flow 328 reaches a branch point 323, at least a portion of the reverse flow 328 is branched into a connecting path 317 and getting directed against reverse flow in an adjacent flow path, forming a reduced reverse flow 319. These redirected reverse flows 328 cumulatively work against the initial reverse flow 328 to reduce the amount of flow 328 traversing in the reverse flow direction 314.

FIG. 3C provides a more detailed illustration of an enhanced cylindrically-modified flow path ring 300 that increase the forward flow open flow path area 332 from ⅓ to at least ½ of the total area 330. Although only one ring 300 is shown, additional rings 300 of the same and/or different size can be included without departing from the scope of the present subject matter.

Figure 4A:
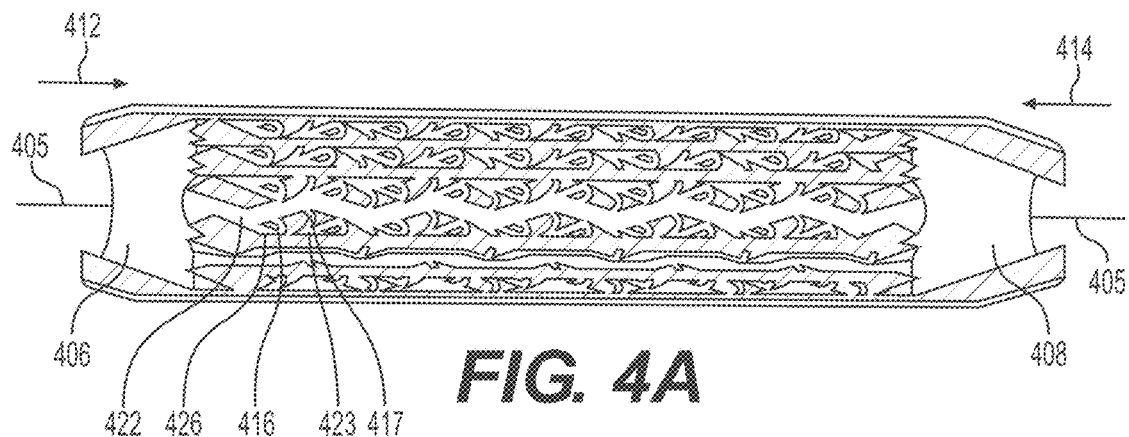
FIGS. 4A-4C illustrate an exemplary embodiment of an enhanced cylindrically-modified Tesla valve.
Figure 4B:
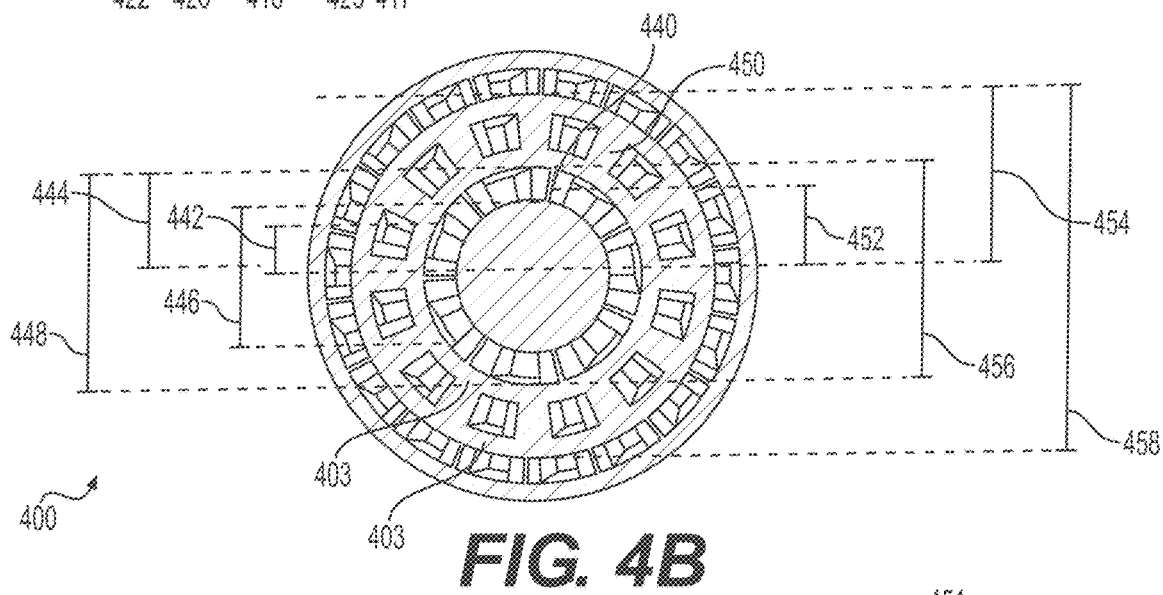
Figure 4C:
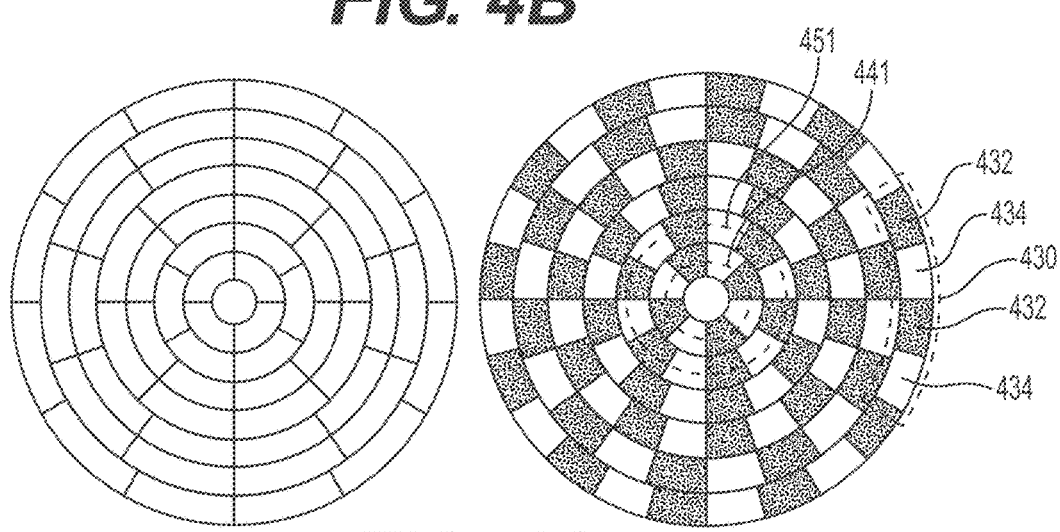

FIGS. 4A-4C illustrate an exemplary embodiment of an enhanced cylindrically-modified Tesla valve 400. The exemplary embodiment incorporates one or more enhanced cylindrically-modified flow path rings 300 having at least ½ of their total area 430 being an open flow path area 432. The number of rings shown is exemplary only, and other numbers of rings can be used without departing from the scope of the present subject matter. As shown in the exemplary embodiments of FIGS. 4A-4C, multiple enhanced flow path rings 300 are coaxially connected in parallel and circumferentially arranged around a flow device centerline 405. The enhanced flow path rings 300 are outwardly arranged, with successive rings placed around each other in the exemplary embodiment shown. In other exemplary embodiments, first and second flow path rings 440/450 are separated by a solid portion 403 closed to flow. Other azimuthal ring placement(s), clocking arrangements, and/or number of rings can be used without departing from the scope of the present subject matter.

FIGS. 4B and 4C illustrate an example of clocking, where the relative position of a ring 300 is circumferentially rotated with respect to at least one other flow ring 300. The relative positioning of each ring 300 has no impact on the forward flow open flow path area 432. The exemplary embodiment shown in FIGS. 4A-4C includes an inlet 406 and an outlet 408, with a plurality of forward and reverse flow paths 422/426 hydraulically connected in parallel to inlet 406 and outlet 408. In the embodiment shown a first group of forward and reverse flow paths 422/426 form a first flow path ring 440 circumferentially arranged at a first radial distance 442 from the flow device centerline 405, with a second flow path ring 450 circumferentially arranged at a second radial distance 452 from the flow device centerline 405. In the embodiment shown, one or more of the flow paths has a first hydraulic resistance in a forward flow direction 412 and a second hydraulic resistance in a reverse flow direction 414, with the second hydraulic resistance being greater than the first hydraulic resistance.

In certain exemplary embodiments, first flow path ring outer radius 444 matches second flow path ring inner radius 454. In still other exemplary embodiments, at least one of the first flow path ring 440 the second flow path ring 450 is arranged in a non-circular elliptical pattern relative to the flow device centerline 405 (see, e.g., FIG. 7A). In certain embodiments the first flow path ring 440 is bounded by a plurality of first azimuthal segments 441 and the second flow path ring 450 is bounded by a plurality of second azimuthal segments 451. In certain other exemplary embodiments, at least one of the flow path rings is made up of azimuthal segments that do not have a neighbor on each side (as shown, for example in FIG. 7B).

In the exemplary embodiment of FIGS. 4A-4C, one or more of the flow paths has a first hydraulic resistance in a forward flow direction 412 and a second hydraulic resistance in a reverse flow direction 414, with the second hydraulic resistance being greater than the first hydraulic resistance. The exemplary embodiment shown has a first pressure drop in the forward flow direction 412 and a second pressure drop in the reverse flow direction 414, with the second pressure drop being greater than the first pressure drop. In this exemplary embodiment, one or more of the flow paths is coaxially-arranged around a flow device centerline 405, with a portion of open flow path area 432 in at least one of the plurality of forward flow paths 422 varying as a function of radial distance from the flow device centerline 405. In certain exemplary embodiments, a portion of open flow path area 432 changes with a square of radial distance from the flow device centerline 405. The embodiment of FIGS. 4A-4C optionally includes at least one tortuous loop 416 in at least one of the forward flow paths 422, with the at least one tortuous loop 416 configured to direct at least a portion of reverse flow (see, e.g., 328 FIGS. 3A-3C) 414 back against itself. In still other embodiments a connecting loop 417 connects the first forward flow path 422 with a second forward flow path 423 and is configured to direct at least a portion of reverse flow 428 fluid flowing in the reverse direction 414 in the first fluid flow path against reverse flow 428 in the second fluid path 423 (see, e.g., FIG. 4A).

As illustrated in FIGS. 4B and 4C, with the cylindrical modification including tortuous loops 416 serving multiple forward flow paths 422, at least half of the total area 430 is forward flow open flow path area 432—an advantage over a traditional Tesla valve 100. This increases the geometric efficiency of the alternation of the tortuous path geometries about the two sides of the "open" parts of the flow paths, and reduces the amount of geometry that generally obstructs flow. The zig-zag structure and side alternation persist in this geometry enhances the flow branching that drives the flow suppression, but with a forward flow rate unobtainable in a traditional Tesla valve.

Figure 5:
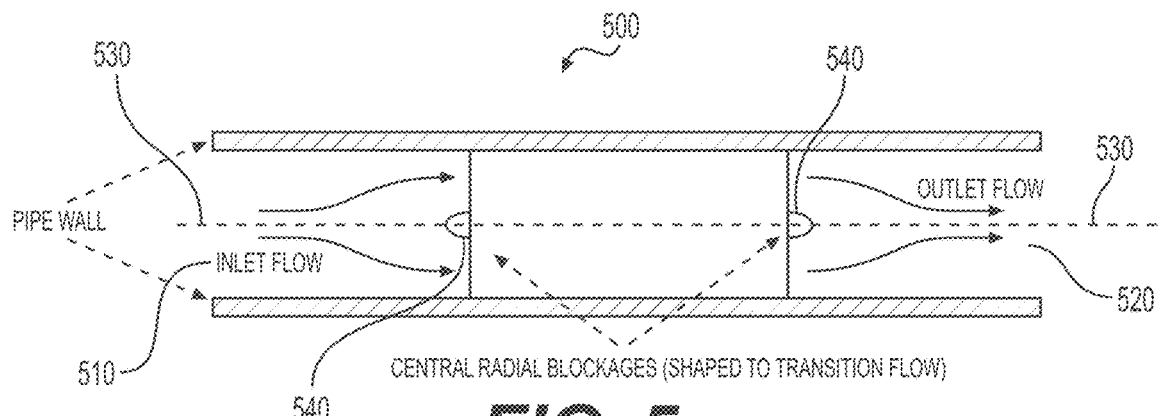
FIG. 5 illustrates an exemplary transition piece.

Certain exemplary embodiments optionally include a transition piece 500, as illustrated in FIG. 5. In the exemplary embodiment shown, transition piece 500 is solid to fluid flow (i.e. fluid is unable to flow in or through the transition piece 500) and is configured to produce a smooth fluid flow into and out of the flow device inlet 510 and/or the flow device exit 520. In the embodiment shown, the transition piece 500 extends from the flow device centerline 530 and protrudes axially in the forward flow direction. In the exemplary embodiment shown, the transition piece center 540 is, solid with spinner shaped (axial inlet/exit protrusions) to transition flow smoothly into and out of the device 500.

Figure 6A:
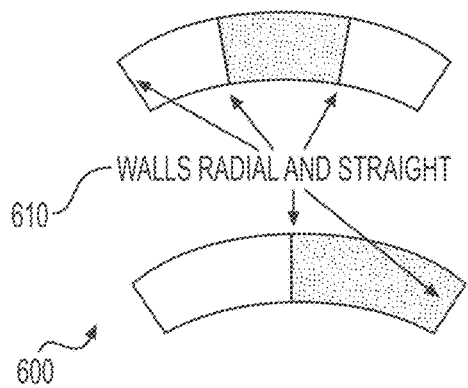
FIGS. 6A and 6B illustrate exemplary embodiments of non-radial tortuous flow path boundary walls.
Figure 6B:
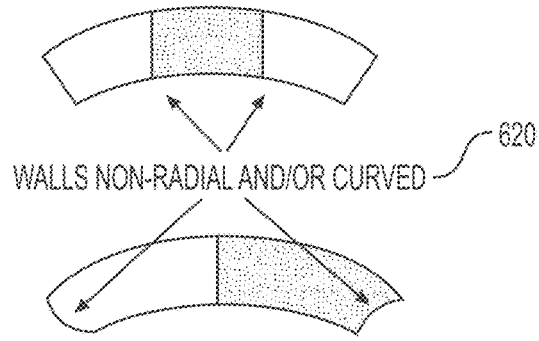

FIGS. 6A and 6B illustrate exemplary flow path boundary walls 600 incorporating radial (straight) segments 610 and/or non-radial and/or non-straight segments 620. In traditional Tesla valves 100, flow path bounding walls 610 are arranged normal to the axial and tortuous path directions. In certain exemplary embodiments of the present subject matter, however, the angle of the tortuous path bounding walls are not necessarily normal to the axial and circumferential directions, (e.g. they are not arranged in a purely radial direction). In these exemplary embodiments, flow area varies as a function of radius, so a more optimal bounding wall angle can arise in a particular application. In these exemplary embodiments, at least some of the flow path boundary walls need not be formed from straight line segments. In certain of these exemplary embodiments, the angle of the flow path walls is modified so that the angle deviates from purely radial (passing through the device centerline) to enable optimization of one or more of the flow velocity, radius, or cross-sectional area of the flow path (i.e. modifying the flow path cross sectional area so that the area changes with the square of the distance (radius) from the centerline). In certain of these exemplary embodiments at least one of the plurality of fluid flow paths includes a flow path boundary wall defined by a plurality of non-straight line segments 620 forming a rounded flow path channel wall. Certain of these exemplary embodiments further include at least one tortuous flow path loop with a loop flow path boundary wall defined by a plurality of non-straight line segments 620 forming a rounded tortuous loop path channel wall.

In certain embodiments, the inlet and/or outlet tortuous path walls are angled, versus square to the flow, to help transition flow into and out of the device. FIG. 6A illustrates exemplary tortuous path walls formed by straight radial segments, while FIG. 6B illustrates exemplary tortuous path walls formed by non-radial and/or curved segments. As illustrated in these exemplary flow path walls, the "straight" walls point toward the center of the pipe (not shown). As shown in FIG. 6A, left side the walls are not parallel to each other, because they point to the center of the pipe (not shown). As shown in the bottom portion of FIG. 6B, the right side the boundaries of the forward flow open area 632 are approximately vertical, but if extended down they would not intersect the center of the pipe (not shown). The walls are parallel to each other, but do not point to the center of the pipe. One exemplary way of manufacturing the flow path walls of FIG. 6A is by using a tapered milling bit, while one exemplary way of manufacturing the flow path walls on the right of FIG. 6B is by using a normal straight milling bit. Other methods known to those of skill in the art can be used instead of or in addition to these methods without departing from the scope of the present subject matter.

These segments a generally referred to as arcs, which combine to form a flow path ring (not shown in FIGS. 6A and 6B). Changing arc sizes (lengths) of the solid and fluid portions of the overall arc alters the relative solidity of the device. In certain instances, increasing the solid portion of the arc size has an undesirable larger impact on forward direction flow, while in other instances decreasing the solid portion of the arc size reduces the efficiency of each axial segment to suppress reversed flow (because the size of the tortuous paths loops become relatively smaller). The optimal mix can be application dependent. In other exemplary embodiments, adding more axial segments of the tortuous path loops is a mechanism for increasing the ability to reduce reverse flow (compounding effect). For example, resistance to reverse flow can be larger if 10 of the same axial segments are used vice three, but this would also increase the parasitic losses for forward flow. The length and size of each arc is exemplary only, and not limited to what is shown. The arc lengths or sizes can be varied, and need not be the same as the other arcs in a ring. The number of flow paths in a ring can be increased or decreased by decreasing or increasing the size of each arc. Shortening an arc allows for additional flow paths in a ring, while increasing the length of an arc decreases the number of flow paths that can be included in a ring.

Figure 7A:
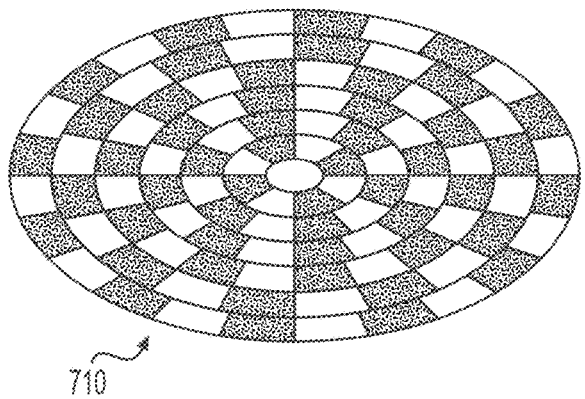
FIGS. 7A and 7B illustrate exemplary embodiments of non-circular modified Tesla valves.
Figure 7B:
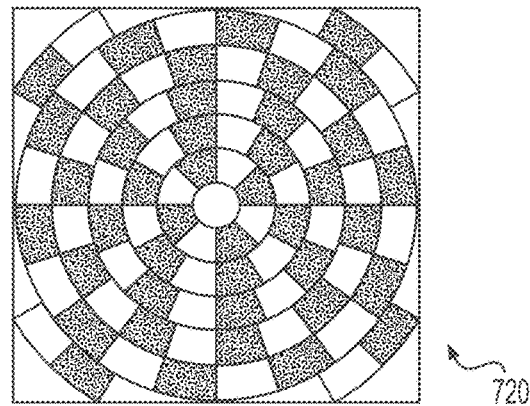

FIGS. 7A and 7B illustrate other exemplary configurations of modified Tesla valves. In these exemplary embodiments, the flow paths are incorporated into non-circular configurations, making them adaptable to piping systems of arbitrary size and cross-sectional shape. As shown in FIG. 7A, for example, rings are deformed to form a non-circular elliptical cross section configuration 710 while in FIG. 7B, the rings are broken up to form a quadrangular cross-section configuration 720. These changes in embodiments with the modified tortuous flow paths have a lower hydraulic resistance to forward flow while retaining a higher hydraulic resistance to reverse flow, with both embodiments having at least a ½ forward flow open area. The embodiment shown in FIGS. 7A and 7B are exemplary only, and not limited to what is shown. Other non-circular configurations can also be used without departing from the scope of the present subject matter. Those of skill in the art understand that features such as the number of rings, radial span of each ring, radial separation between each ring pair, number of azimuthal segments in each ring, and clocking of azimuthal segments between adjacent rings can be modified without departing from the scope of the present subject matter.

Figure 8A:
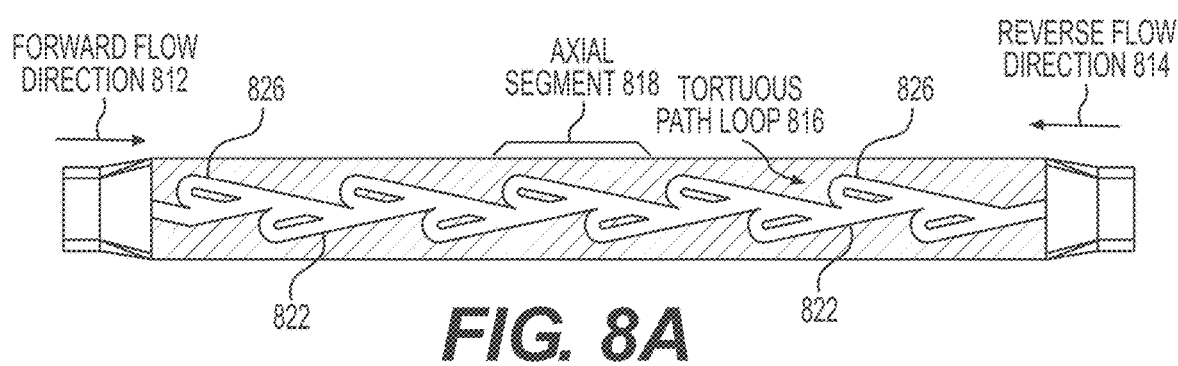
FIGS. 8A-8F illustrate still other exemplary embodiments of cylindrically-modified Tesla valves.
Figure 8B:
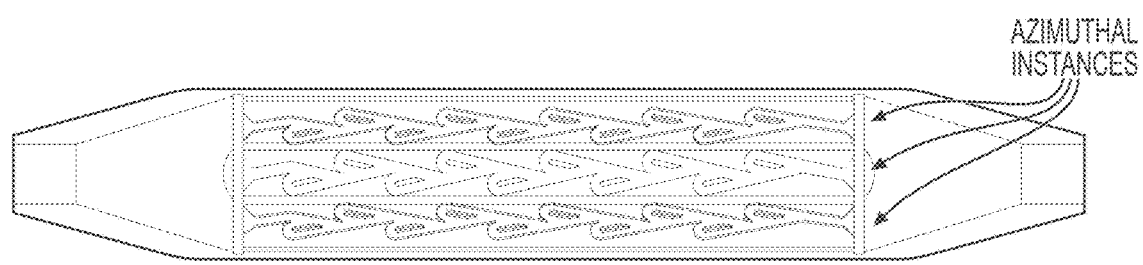
Figure 8C:
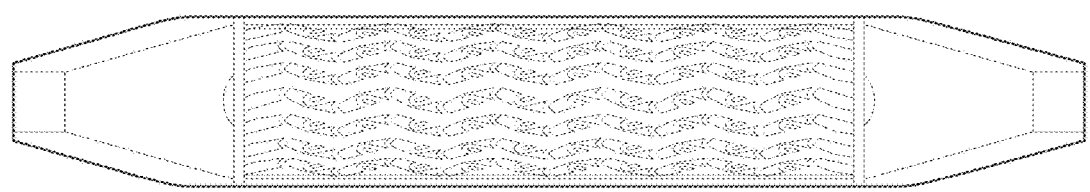
Figure 8D:
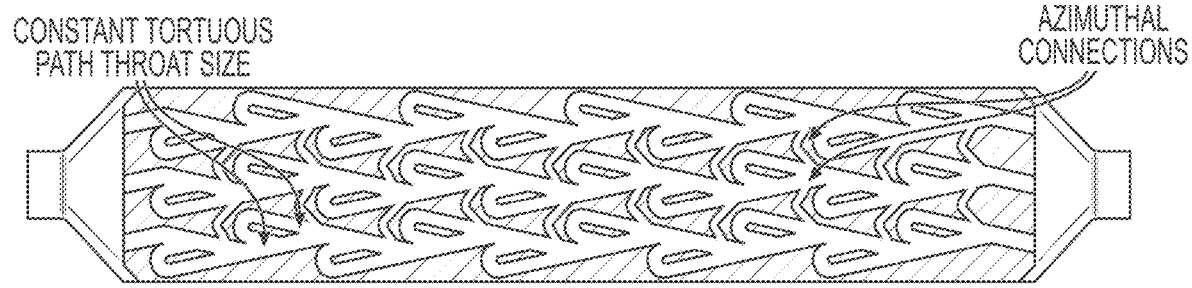
Figure 8E:
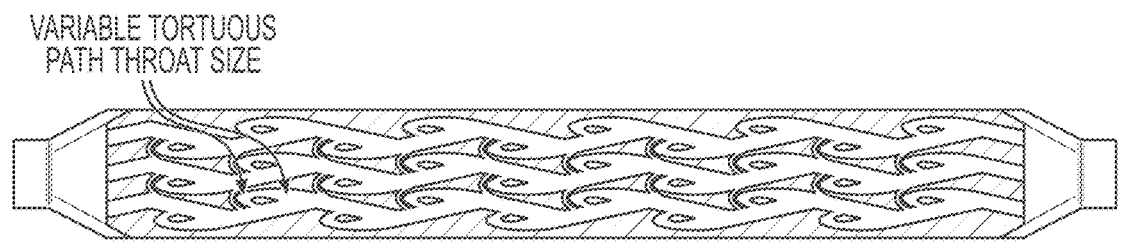
Figure 8F:
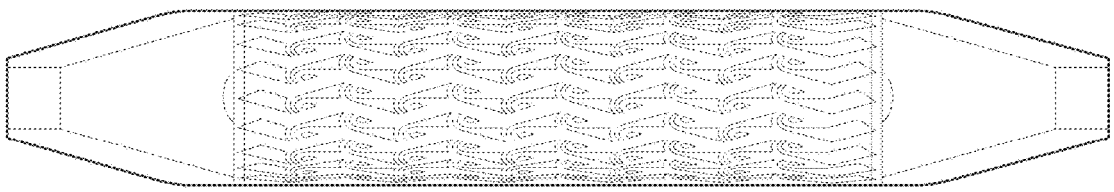

FIGS. 8B-8F illustrate exemplary embodiments of enhanced Tesla valves with varying arrangements of parallel flow paths, compared with a traditional Tesla valve configuration in FIG. 8A. The exemplary embodiments are geometrically configured to reduce the perturbations to flow in the forward direction (low hydraulic resistance), while retaining the ability to restrict flow in the reverse direction (high hydraulic resistance) and, in certain embodiments, to incorporate a circular cross section configuration. These valves were built using additive manufacturing, but other manufacturing techniques known to those of skill in the art can be used without departing from the scope of the present subject matter. These embodiments were tested to measure the fraction of open forward flow area, and to measure the hydraulic resistance. Hydraulic resistance is defined in terms of a k factor (pressure drop per dynamic head (to relate to a given flow rate)). The relative performance of these embodiments is summarized in Table 1, with the reverse flow k factor placed in the numerator and the forward flow k factor in the denominator, to form the diodicity ratio (i.e., the higher the k factor the greater the pressure drop in the reverse flow direction relative to the forward flow pressure drop, so diodicity ratio is greater than 1.0).

For ideal fluid situations, pressure drop is related to the square of the flow rate. So, for example, if flow rate doubles, the pressure drop increases by a factor of 4 in each direction, and the diode ratio remains the same. Typically, hydraulic flow resistance (the comparative basis for assessing diode-type behavior) is expressed as a "k" factor that relates head loss (drop in total pressure) to the dynamic head:

$$\Delta p_{tot} = k \frac{1}{2} \rho u^2 \tag{1}$$

For testing the embodiments of FIGS. 8A-8F, the pressure measurement lines were arranged at the same vertical height and are outboard of the flow branching that happens within the valves; therefore, the change in total pressure was equivalent to the change in static pressure (thus Δp is written on a go-forward basis, rather than $\Delta p_{tot}$). The dynamic head is related to the measured volumetric flow (Q), the fluid density (ρ), and the reference flow area (A), which for data comparison purposes is the area of the inlet pipe, which is the same for all test evolutions $$\frac{1}{2} \rho u^2 = \frac{1}{2} \frac{\dot{m}^2}{\rho A^2} = \frac{1}{2} \rho \frac{Q^2}{A^2} \tag{2}$$

The data provides a means to establish the k-factor:

$$k_{measured} = \frac{\Delta p_{measured}}{\frac{1}{2} \rho u^2} = \frac{\Delta p_{measured}}{\frac{1}{2} \rho \frac{Q^2}{A^2}} \tag{3}$$

The pressure drop has a bias that includes parasitic losses between measurement points and the valve ends, so the k of interest is related to the measured and parasitic losses as:

$$k_{measured} = k + k_{parasitic} \tag{4}$$

$$k = k_{measured} - k_{parasitic} \tag{5}$$

The parasitic loss factor is established by curve fitting the parasitic loss data against the non-dimensional Reynolds number. This is a traditional approach taken in open literature to reduce flow resistance data, because it parameterizes the behavior in a scalable fashion. In this treatment, Reynolds number is based on the diameter, D, of the flexible tubing of flow area, A. The tubing has an inner diameter of ½ inch. The dynamic viscosity, μ, and fluid density are established from water property fits, and driven by the measured temperature.

$$k_{parasitic} = \frac{\Delta p_{parasitic}}{\frac{1}{2} \rho \frac{Q^2}{A^2}} \text{ versus } Re = \frac{\rho u D}{\mu} = \frac{\rho Q D}{A \mu} \tag{6}$$

Table 1 summarizes the performance of the embodiments of FIGS. 8A-8F, with FIGS. 9 and 10 providing detailed test data for builds 5 and 6 (the embodiments of FIGS. 8E and 8F), including but not limited to data on forward and reverse flow rates and forward and reverse pressure drops. The diode-type behavior, and thus the successful progression of the builds, is evidenced by the distinctly higher resistance to flow in the reverse direction. A k ratio >1 shows that the diode type behavior is exhibited.

| | | Key Features | | | | General |
|---|---|---|---|---|---|---|
| Number | Name | Piping Geometry Type | Component Connections | Tortuous Path Description | Fraction of Open Flow Area | Diode Ratio $K_{rev}/K_{fwd}$ |
| 1 | Traditional | Rectangular | Independent | Traditional | 1/3 | ~7.5 |
| 2 | Cylindrical | Cylindrical | Independent | Traditional | 1/3 | ~2.2 |
| 3 | Initial Cylindrically Modified | Cylindrical | Azimuthal Connections | Revision 1 | 1/2 | ~1.02 |
| 4 | Flat, with Cylindrical Connections | Rectangular | Azimuthal Connections | Revision 2 | 1/2 | ~4.4 |
| 5 | Flat, with Enhanced Geometry | Rectangular | Azimuthal Connections | Revision 3 | 1/2 | ~3.2 |
| 6 | Final Cylindrically Modified | Cylindrical | Azimuthal Connections | Revision 3 | 1/2 | ~1.2 |

It will be understood that many additional changes in the details, materials, steps and arrangement of parts, which have been herein described and illustrated to explain the nature of the subject matter, may be made by those skilled in the art within the principle and scope of the invention as expressed in the appended claims.

The invention claimed is:

1. A flow device, comprising:
an inlet;
an outlet;
a first fluid flow path hydraulically connected in parallel to the inlet and the outlet;
a second fluid flow path hydraulically connected in parallel to the inlet and the outlet;
a first loop in the first flow path directed in a reverse flow direction of the first fluid flow path;
a second loop in the second flow path directed in a reverse flow direction of the second fluid flow path; and
an interconnecting path directing reverse flow from the first loop into forward flow of the second flow path and against the reverse flow direction of the second loop, wherein
the first fluid flow path and the second fluid flow path have a first hydraulic resistance in a forward flow direction and a second hydraulic resistance in a reverse flow direction, and
the second hydraulic resistance is greater than the first hydraulic resistance.

2. The flow device of claim 1, wherein:
each of the plurality of fluid flow paths has a first pressure drop in the forward flow direction and a second pressure drop in the reverse flow direction; and
the second pressure drop is greater than the first pressure drop.

3. The fluid flow device of claim 2, wherein at least one of the plurality of fluid flow paths includes a flow path boundary wall defined by a plurality of non-straight line segments.

4. The flow device of claim 2, wherein the at least one loop includes a loop flow path boundary wall defined by a plurality of non-radial line segments.

5. The flow device of claim 1, wherein each of the plurality of fluid flow paths is coaxially-arranged around a flow device centerline.

6. The flow device of claim 5, wherein a forward flow area in each of the plurality of flow paths varies as a function of a radial distance from the flow device centerline.

7. The flow device of claim 6, wherein the forward flow area changes with a square of the radial distance from the flow device centerline.

8. A flow device, comprising:
an inlet;
an outlet; and
a plurality of fluid flow paths hydraulically connected in parallel to the inlet and the outlet; wherein
the plurality of fluid flow paths forms a first ring of fluid flow paths circumferentially arranged at a first radial distance from a centerline of the fluid flow device,
a second ring of fluid flow paths circumferentially arranged at a second radial distance from the centerline of the fluid flow device,
each of the plurality of fluid flow paths has a first hydraulic resistance in a forward flow direction and a second hydraulic resistance in a reverse flow direction, and
the second hydraulic resistance is greater than the first hydraulic resistance; and wherein
at least one of the first and second fluid flow path rings has:
a first fluid flow path hydraulically connected in parallel to the inlet and the outlet;
a second fluid flow path hydraulically connected in parallel to the inlet and the outlet;
a first loop in the first flow path directed in a reverse flow direction of the first fluid flow path;
a second loop in the second flow path directed in a reverse flow direction of the second fluid flow path; and
an interconnecting path directing reverse flow from the first loop into forward flow of the second flow path and against the reverse flow direction of the second loop.

9. The flow device of claim 8, wherein:
each of the plurality of fluid flow paths has a first pressure drop in the forward flow direction and a second pressure drop in the reverse flow direction; and
the second pressure drop is greater than the first pressure drop.

10. The flow device of claim 9, wherein an outer radius of the first fluid flow path ring matches an inner radius of the second fluid flow path ring.

11. The flow device of claim 10, wherein at least one of the first ring and the second ring is arranged in a non-circular elliptical pattern relative to the fluid flow device centerline.

12. The flow device of claim 11, further comprising:
a first plurality of azimuthal segments in the first ring; and
a second plurality of azimuthal segments in the second ring.

13. The flow device of claim 8, wherein each of the plurality of fluid flow paths is coaxially-arranged around a flow device centerline.

14. The flow device of claim 13, wherein a forward flow area in each of the plurality of flow paths varies as a function of a radial distance from the flow device centerline.

15. The flow device of claim 14, wherein the forward flow area changes with a square of the radial distance from the flow device centerline.

\* \* \* \* \*